US010926475B2

(12) United States Patent
Blaier et al.

(10) Patent No.: US 10,926,475 B2
(45) Date of Patent: Feb. 23, 2021

(54) METHOD, SYSTEM AND PROGRAM PRODUCT FOR OPTIMIZING MECHANICAL DESIGN FOR ADDITIVE MANUFACTURING

(71) Applicant: Castor Technologies Ltd., Kfar Hes (IL)

(72) Inventors: Omer Blaier, Kfar Hes (IL); Elad Schiller, Tel Aviv (IL)

(73) Assignee: Castor Technologies Ltd., Kfar Hes (IL)

(*) Notice: Subject to any disclaimer, the term of this patent is extended or adjusted under 35 U.S.C. 154(b) by 86 days.

(21) Appl. No.: 16/429,136

(22) Filed: Jun. 3, 2019

(65) Prior Publication Data

US 2019/0366644 A1 Dec. 5, 2019

Related U.S. Application Data

(60) Provisional application No. 62/679,832, filed on Jun. 3, 2018.

(51) Int. Cl.
*B29C 64/393* (2017.01)
*G06F 30/17* (2020.01)
(Continued)

(52) U.S. Cl.
CPC ............ *B29C 64/393* (2017.08); *G06F 30/17* (2020.01); *B33Y 10/00* (2014.12); *B33Y 30/00* (2014.12); *B33Y 50/02* (2014.12)

(58) Field of Classification Search
CPC ....... B29C 64/393; B33Y 10/00; B33Y 30/00; B33Y 50/02; B33Y 50/00; G06F 30/00; G06F 30/17
See application file for complete search history.

(56) References Cited

U.S. PATENT DOCUMENTS 6,073,987 A * 6/2000 Lindberg ............. B62D 25/142
180/90
10,061,300 B1 * 8/2018 Coffman ................ G06N 20/20
(Continued)

OTHER PUBLICATIONS

European Search Report and the European Search Opinion dated Jan. 9, 2020 From the European Patent Office Re. Application No. 19177960.2.
(Continued)

*Primary Examiner* — Ramesh B Patel

(57) ABSTRACT

A method of optimizing mechanical design for additive manufacturing, comprising: acquiring a digital file containing a description of a mechanical assembly, the assembly includes a plurality of mechanical parts; scanning the digital file to identify mechanical connections between adjacent of the plurality of mechanical parts; identifying a full cluster of connected mechanical parts based on the scanning, the connected mechanical parts are designed to be manufactured from similar materials; and identifying a usable cluster of connected mechanical parts to be combined into one mechanical part, the usable cluster is a sub-cluster of the full cluster, by iteratively: estimating eligibility of the mechanical parts in a current cluster to be manufactured as one mechanical part by additive manufacturing, the current cluster is a sub-cluster of the full cluster; and removing at least one mechanical part from the current cluster.

21 Claims, 4 Drawing Sheets

(51) Int. Cl.
    *B33Y 10/00*    (2015.01)
    *B33Y 30/00*    (2015.01)
    *B33Y 50/02*    (2015.01)

(56) References Cited

U.S. PATENT DOCUMENTS

| | | | |
|---|---|---|---|
| 10,078,325 B2* | 9/2018 | Gunnarsson | G05B 15/02 |
| 2016/0096318 A1* | 4/2016 | Bickel | B33Y 10/00 |
| | | | 264/40.1 |
| 2018/0120813 A1* | 5/2018 | Coffman | G06F 30/00 |
| 2020/0324465 A1* | 10/2020 | Deruyck | B29C 64/135 |

OTHER PUBLICATIONS

Kannan "Design for Additive Manufacturing", Assembly Magazine, XP055647032, 6 P., Mar. 1, 2017.
Rey "Object Detection With Deep Learning: The Definitive Guide", Tryo Labs Blog, XP055647244, p. 1-10, Aug. 30, 2017.
Wikipedia "Bolted Joint", Wikipedia, The Free Encyclopedia, XP055647311, p. 1-9, Apr. 26, 2018.
Yang et al. "Additive Manufacturing-Enabled Part Count Reduction: A Lifecycle Perspective", Journal of Mechanical Design, XP055645823, 140(3): 031702-1-031702-14, Mar. 2018.
Yang et al. "Towards a Numerical Approach of Finding Candidates for Additive Manufacturing-Enabled Part Consolidation", Journal of Mechanical Design, XP055645804, 140(4): 1-13, Apr. 2018.

* cited by examiner

METHOD, SYSTEM AND PROGRAM PRODUCT FOR OPTIMIZING MECHANICAL DESIGN FOR ADDITIVE MANUFACTURING

RELATED APPLICATION(S)

This application claims the benefit of priority under 35 USC § 119(e) of U.S. Provisional Patent Application No. 62/679,832 filed on Jun. 3, 2018, the contents of which are incorporated by reference as if fully set forth herein in their entirety.

FIELD AND BACKGROUND OF THE INVENTION

The present invention, in some embodiments thereof, relates to optimization of additive manufacturing and, more particularly, but not exclusively, to combining mechanical parts to be manufactures as a single mechanical part.

Additive manufacturing, or three-dimensional (3D) printing, is a process in which a three-dimensional object is manufactured by depositing or forming thin layers of material in succession so as to build up the desired 3D structure. Such processes are typically used for design, demonstration and mechanical prototyping.

In recent years, 3D printing technologies have improved in accuracy, working volume, the variety of build materials available and overall cost, and became increasingly more accessible. This provides more opportunity for potentially using these technologies to replace, in some cases, traditional manufacturing such as milling and casting.

SUMMARY OF THE INVENTION

According to an aspect of some embodiments of the present invention there is provided a method of optimizing mechanical design for additive manufacturing, comprising: acquiring a digital file containing a description of a mechanical assembly, the assembly includes a plurality of mechanical parts; scanning the digital file to identify mechanical connections between adjacent of the plurality of mechanical parts; identifying a full cluster of connected mechanical parts based on the scanning, the connected mechanical parts are designed to be manufactured from similar materials; and identifying a usable cluster of connected mechanical parts to be combined into one mechanical part, the usable cluster is a sub-cluster of the full cluster, by iteratively: estimating eligibility of the mechanical parts in a current cluster to be manufactured as one mechanical part by additive manufacturing, the current cluster is a sub-cluster of the full cluster; and removing at least one mechanical part from the current cluster.

Optionally, the full cluster includes all mechanical parts which are connected to each of the mechanical parts which are included in the full cluster.

Optionally, the scanning is done by using deep learning algorithm which is based on image recognition.

Optionally, the scanning includes: identifying holes defined in the plurality of mechanical parts, each designated to encompass a bolt; identifying at least two adjacent of the holes defined in at least two adjacent of the plurality of mechanical parts, the at least two holes having the same axis.

Optionally, the scanning includes identifying associations between mechanical parts which are defined in the digital file.

Optionally, the method further comprises, after the acquiring: estimating eligibility of each of the plurality of mechanical parts to be manufactured by additive manufacturing; wherein said scanning is performed only for a subset of the plurality of mechanical parts which are eligible to be manufactured by additive manufacturing.

Optionally, the scanning is performed separately for each of a plurality of subsets of the plurality of mechanical parts, each of the plurality of subsets includes mechanical parts which are designed to be manufactured from similar materials.

Optionally, the method further comprises: repeating the identifying usable cluster by removing different from mechanical parts the current cluster to create a plurality of alternative usable clusters.

Optionally, the method further comprises: estimating cost of manufacturing each of the alternative usable clusters and selecting at least one preferred usable cluster based on the cost estimation.

Optionally, the method further comprises: repeating the identifying full cluster and the identifying usable cluster for mechanical parts designed to be manufactured from each of a plurality of groups of similar materials.

Optionally, the estimating eligibility includes comparing size of the mechanical parts with a maximal size and a minimal size.

Optionally, the estimating eligibility includes identifying thickness of thin areas of the mechanical parts.

Optionally, the estimating eligibility includes identifying unclosed contours and self-intersections of polygons in the description of the mechanical parts.

Optionally, the estimating eligibility includes estimating cost for printing the mechanical parts.

Optionally, the method further comprises, after the scanning: storing in a dataset a plurality of references to mechanical parts from the plurality of mechanical parts which are associated with the identified mechanical connections.

Optionally, the method further comprises, after the acquiring: storing in a dataset a plurality of references to mechanical parts from the plurality of mechanical parts which are adjacent to others of the plurality of mechanical parts.

Optionally, the method further comprises: presenting to a user a suggestion to combine all connected mechanical parts in the usable cluster into one combined mechanical part and to manufacture the combined mechanical part by additive manufacturing.

Optionally, the method further comprises: presenting to the user a cost estimation of manufacturing the mechanical assembly including the combined mechanical part.

According to some embodiments of the invention there is provided a computer readable medium comprising computer executable instructions adapted to perform the method.

According to an aspect of some embodiments of the present invention there is provided a software program product for optimizing mechanical design for additive manufacturing, comprising: a non-transitory computer readable storage medium; a memory for storing a digital file containing a description of a mechanical assembly, the assembly includes a plurality of mechanical parts; first program instructions for scanning the digital file to identify mechanical connections between adjacent of the plurality of mechanical parts; second program instructions for identifying a full cluster of connected mechanical parts based on the scanning, the connected mechanical parts are designed to be manufactured from similar materials; and third program instructions for identifying a usable cluster of connected mechanical parts to be combined into one mechanical part, the usable cluster is a sub-cluster of the full cluster, by iteratively: estimating eligibility of the mechanical parts in a current cluster to be manufactured as one mechanical part by additive manufacturing, the current cluster is a sub-cluster of the full cluster; and removing at least one mechanical part from the current cluster; wherein the first, second and third program instructions are executed by at least one computerized processor from the non-transitory computer readable storage medium.

According to an aspect of some embodiments of the present invention there is provided a system for optimizing mechanical design for additive manufacturing, comprising: a memory for storing a digital file containing a description of a mechanical assembly, the assembly includes a plurality of mechanical parts; a scanning module for scanning the digital file to identify mechanical connections between adjacent of the plurality of mechanical parts; a clustering module for identifying a full cluster of connected mechanical parts based on the scanning, the connected mechanical parts are designed to be manufactured from similar materials; and an iteration module for identifying a usable cluster of connected mechanical parts to be combined into one mechanical part, the usable cluster is a sub-cluster of the full cluster, by iteratively: estimating eligibility of the mechanical parts in a current cluster to be manufactured as one mechanical part by additive manufacturing, the current cluster is a sub-cluster of the full cluster; and removing at least one mechanical part from the current cluster.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
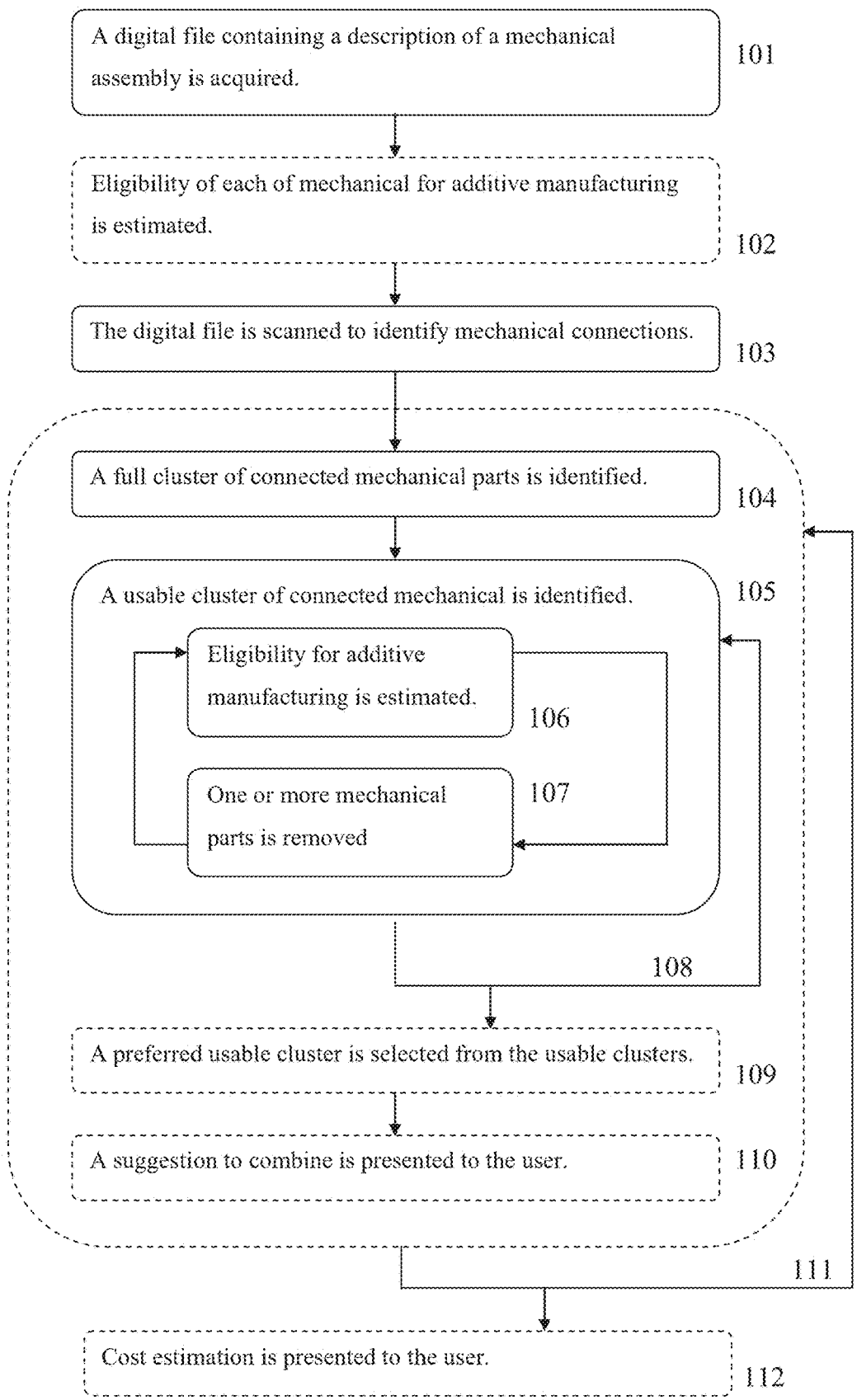
FIG. 1 is a flowchart schematically representing a method of optimizing mechanical design for additive manufacturing, according to some embodiments of the present invention.

The present invention, in some embodiments thereof, relates to optimization of additive manufacturing and, more particularly, but not exclusively, to combining mechanical parts to be manufactures as a single mechanical part.

Although additive manufacturing, or three-dimensional (3D) printing, is now mature enough to 3D print end-use parts for mass production, lack of information and in-house expertise may be a main bottleneck for manufacturers to adopt the technology. Using 3D printing may, in some cases, reduce lead-time, help with avoiding costly spending on limited quantities, and increase manufacturing flexibility. An assisting tool for design improvements and decision-making regarding the optimal use of 3D printing for a specific project is therefore beneficial. This may enable for example designers, new product introduction (NPI) managers and/or production engineers to decide whether to prefer 3D printing over traditional manufacturing methods, by providing technical analysis and cost-saving advice for a full machine design.

In addition, with more and more computer aided design (CAD) software generating different file formats for various kind of applications, it's necessary to perform CAD analysis, over the 3D printing file format, such as stereolithography (STL) file, which keeps the user agnostic to the CAD software vendor, and reduces the dependency of the user on the CAD software data.

According to some embodiments of the present invention, there are provided methods and systems for optimizing mechanical design for additive manufacturing and aids for decision making regarding additive manufacturing. These methods and systems may be used in cases where the separated mechanical parts were designed for traditional manufacturing methods (such as injection molding, computer numerical control (CNC), etc.), and not additive manufacturing. The mechanical parts' design is analyzed "as is", as designed for traditional manufacturing, and it is determined whether the design has the right characteristics to be 3D printed as a single piece.

A digital file containing a description of a mechanical assembly, such as a CAD file, and optionally a bill of materials (BOM), is analyzed to identify mechanical connections between adjacent mechanical parts of the assembly. For each group of mechanical parts that are designed to be manufactured from similar materials, a full cluster of connected mechanical parts is identified. From this full cluster, sub-clusters are tested to be combined into one mechanical part. This is done by iteratively estimating eligibility for additive manufacturing and removing one or more mechanical parts, to find a usable cluster. Multiple alternative usable clusters may be identified, and at least one is selected to be printed as one mechanical part, for example based on cost estimate.

Estimating eligibility for additive manufacturing may include comparing size of the mechanical parts with a maximal size and a minimal size, identifying thickness of thin areas of the mechanical parts, identifying unclosed contours and self-intersections of polygons in the description of the mechanical parts, identification of the mechanical part being an off-the-shelf item, cost estimation for printing the mechanical part and/or suggesting change of material to obtain eligibility.

Printing multiple designed mechanical parts as one mechanical part may greatly reduce the complexity of the product and have the added value of lowering costs, reducing the chance of breakdown, easy assembly, maintenance and the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart schematically representing a method of optimizing mechanical design for additive manufacturing, according to some embodiments of the present invention.

Figure 2:
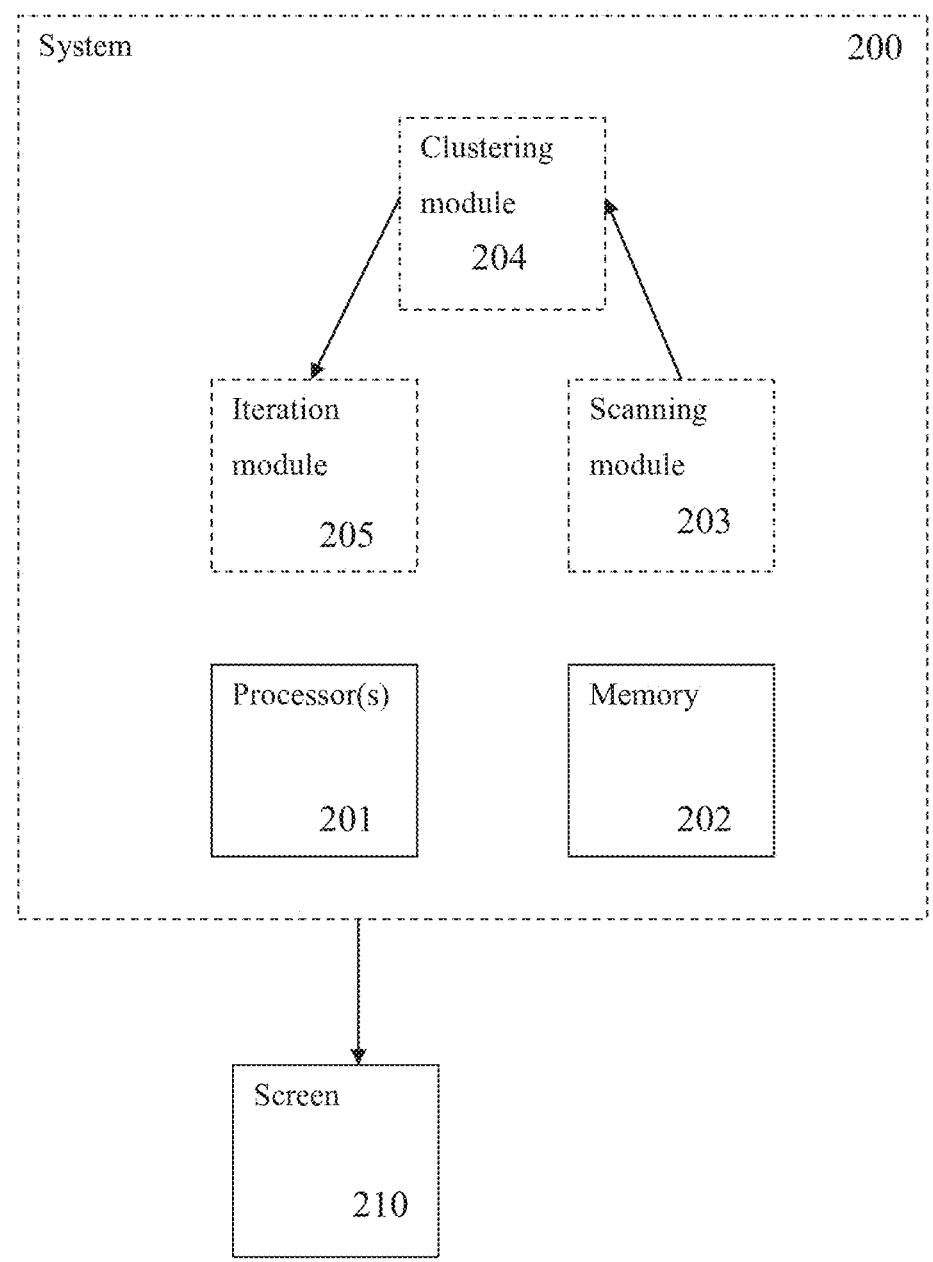
FIG. 2 is a schematic illustration of a system for optimizing mechanical design for additive manufacturing, according to some embodiments of the present invention.

Reference is also made to FIG. 2, which is a schematic illustration of a system for optimizing mechanical design for additive manufacturing, according to some embodiments of the present invention. System 100 may include, for example, a computer, a server, a computing node, a cluster of computing nodes and/or the like. The system 200 may include a processor(s) 201 for executing a process such as the method of FIG. 1 and a memory 202 for storing code and/or data.

The processor(s) 201, homogenous or heterogeneous, may include one or more processing nodes arranged for parallel processing, as clusters and/or as one or more multi core processor(s). The memory 202 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The memory 202 may further comprise one or more local and/or remote network storage resources, for example, a storage server, a Network Attached Storage (NAS), a network drive, and/or the like accessible via one or more networks through an I/O interface.

The processor(s) 201 may execute one or more software modules, for example, a process, a script, an application, an agent, a utility, a tool and/or the like each comprising a plurality of program instructions stored in a non-transitory medium and executed by one or more processors such as the processor(s) 201.

Optionally, the system 200 is provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

First, as shown at 101, a digital file containing a description of a mechanical assembly is acquired. The assembly includes a plurality of mechanical parts. The digital file may be, for example, an assembly CAD file, a collection of STL files. The digital file may be generated by exporting from CAD software such as Solidworks, Autodesk and the like, or any other 3D modeling program. The digital file may be acquired, for example, by a user selecting the file and/or uploading it to be stored in the memory 202. Optionally, the CAD file may be converted to one or more STL file, which is suitable as input for 3D printing process.

The digital file may also be accompanied by other complementary files, such as material properties list of the CAD software (for example .xslx, .csv file types) and/or traditional production costs by the assembly's BOM, which may be exported from an ERP system, such as SAP, MFG and the like.

Figure 3:
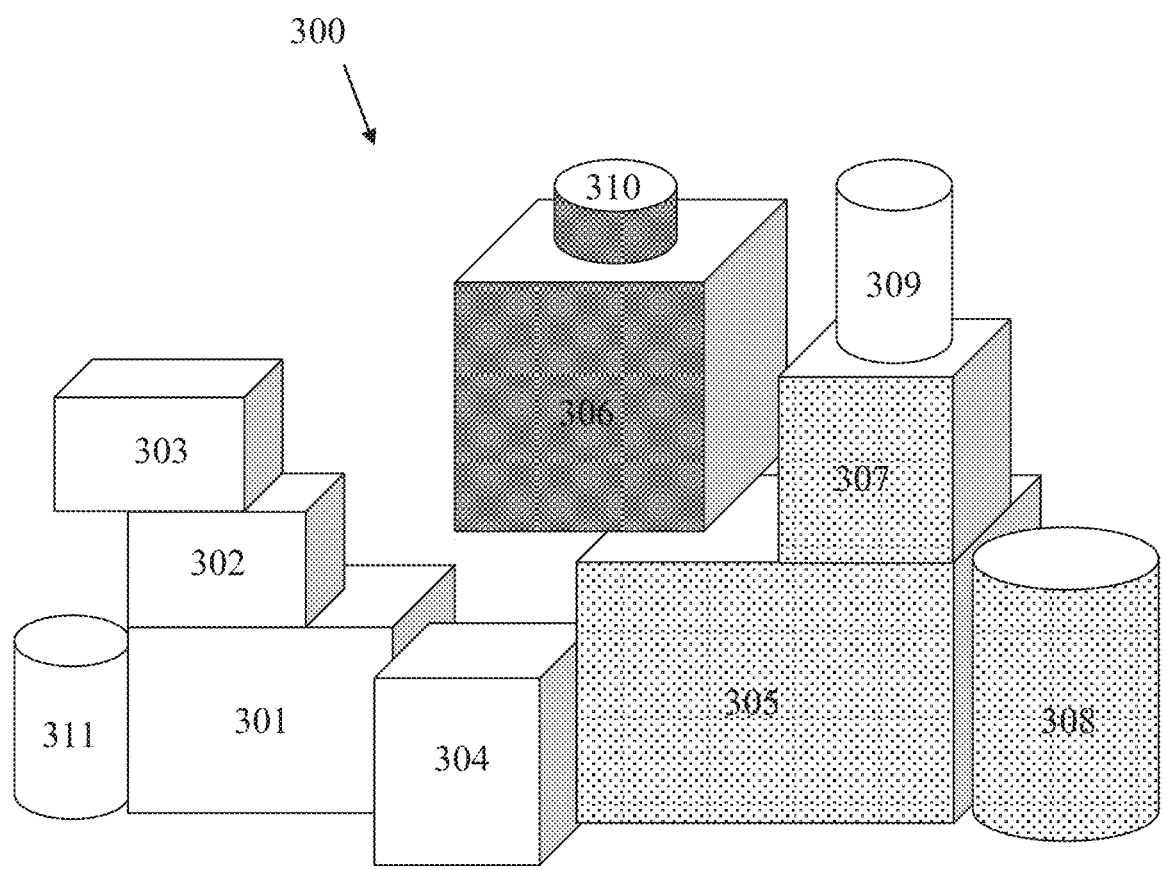
FIG. 3 is an illustration of an exemplary schematic assembly which includes a plurality of mechanical parts, according to some embodiments of the present invention.

Reference is now made to FIG. 3, which is an illustration of an exemplary schematic assembly which includes a plurality of mechanical parts, according to some embodiments of the present invention. Assembly 300 includes the parts 301-310.

Optionally, references to mechanical parts of the assembly, which are adjacent to other mechanical parts, are stored in a dataset. Optionally, each entry in the dataset represents one mechanical part and includes references to all mechanical parts adjacent to the one mechanical part. Optionally, each entry in the dataset represents an adjacency between two mechanical parts.

The dataset may be created, for example, by reviewing each mechanical part in the digital file and finding other mechanical parts which are adjacent to that mechanical part.

Optionally, the entries in the dataset are divided to groups based on the material from which each mechanical part is designed to be manufactured. The division may be based on material groups of similar materials, so that each material in the material group is interchangeable with another material in the same material group. For example, a material group may include different types of metals, while another material group may include different types of plastics. For example, aluminum alloys such as 6061 alloy, 6061-0 (ss), 6061-T4 (ss), 6061-T6 (ss) may be included in one material group (based on Young's Modulus as a reference for strength) and may all be approximately replaced for example with AlSi10Mg powder for a selective laser melting (SLM) process. For another example, ethylene propylene diene monomer (EPDM) rubber, Nylon and acrylonitrile butadiene styrene (ABS) may be included in one material group and may all be replaced for example by Nylon12 plastic having similar mechanical properties. References to all mechanical parts which are designed to be manufactured from a material included in one material group are included in one mechanical parts group.

Similar materials, as used herein, are materials which have similar mechanical properties. The properties may include, for example, tensile strength, impact strength, tensile modulus and/or any other mechanical property. This may be determined, for example, by a predefined list of materials which is compared to the material defined in the digital file for each of the mechanical parts.

For example, the mechanical parts of the assembly 300 may be divided into 3 groups: a first group including mechanical parts 301, 302, 303, 304, 309 and 311, designed to be manufactured of plastic, a second group including mechanical parts 305, 307 and 308, designed to be manufactured of metal, and a third group including mechanical parts 306 and 310, designed to be manufactured of wood.

Optionally, as shown at 102, eligibility of each of mechanical parts to be manufactured by additive manufacturing is estimated. The eligibility may be estimated for different printing technologies and/or different 3D printers. A database of previously estimated mechanical parts may be used for accelerating the process, by comparing a current mechanical part to a similar part from the database.

The estimation may include comparing size of the mechanical parts with a maximal size and a minimal size. The maximal size is depending on tray size of the specific 3D printer that is used. The minimal size depends on printing technology, and may be, for example, 50 millimeters (mm) in each dimension.

The estimation may include identifying thickness of thin areas of the mechanical parts. Thickness of thin walls is required to be above a 3D printer limitation. The minimal wall thickness may be determined by the most suitable technology for the mechanical part. The limitation may include, for example, a size of 50 mm in 20% of the area. The limitation may also include, for example, width/height/depth ratio (aspect ratio) that is above 3D printer limitation. The estimation may also include identifying other structural limitations, such as small pins, narrow gaps and/or lack of support.

The estimation may also include identifying errors such as unclosed contours and self-intersections of polygons in the description of the mechanical parts. This may include identifying whether the mechanical part's file is watertight closed and has no self-intersection. These errors may occur when transforming a CAD files to STL file(s) and several data points may be missing in the STL file(s). The errors may cause defects to the printed part, due to the digitization of the slicing process done by the 3D printer software. The expected defects are analyzed to determine whether the each defect is sever, moderate or light, to estimate the effect on the 3D printing process. Optionally, the errors are corrected and updated in the STL file(s).

The estimation may also include detection of additional requirements, for example, requirement of a special surface finish, accuracy requirements of, for example, less than 0.1 mm and/or any other requirement.

The estimation may also include identification of the mechanical part being an off-the-shelf item. In this case, purchasing the item is more cost effective than manufacturing. This may be determined, for example, when the name of the mechanical part in the digital file includes, for example, DIN, ISO, BN and/or a name from the CAD software toolbox.

The estimation may also include cost estimation for printing the mechanical part. This may be done by analysis of multiple parameters, for example, amount and cost of material used during print (including support material), print preparation time, machine usage time, consumables during print, labor time engaged with the printer operation, post-process time and effort (cleaning, polish, painting, hardening time), depreciation of the 3D printer cost (annual depreciation and/or machine operation cost, when the printer is privately owned) and/or any other parameter. Optionally, the cost estimation may include comparison to estimated cost for manufacturing by different methods.

Optionally, the estimation may include suggesting change of material to obtain eligibility for additive manufacturing and/or lower cost. For example, suggesting a similar material which is suitable for 3D printing, or that is lower in cost.

Optionally, entries in the dataset which are related to mechanical parts that are not eligible are removed from the dataset.

Then, as shown at 103, the digital file is scanned, for example by a scanning module 203, to identify mechanical connections between adjacent mechanical parts of the assembly. A mechanical connection, as used herein, is a rigid, solid, static connection between two mechanical parts, so that no motion between the mechanical parts is possible and/or required. This means that the functionality of the manufactured assembly is not affected by permanent attachment of the two mechanical parts.

The mechanical connections may include, for example, welding, threads with screws and/or bolts, rivets, fittings, fasteners, crimps and/or any other connection. Associations between mechanical parts such as hinges, bearings, ball joints, universal joint etc., which allow motion between the mechanical parts, are not identified as mechanical connections.

Optionally, the scanning is performed only for a subset of the mechanical parts, which are eligible to be manufactured by additive manufacturing and/or which are included in one mechanical parts group based on manufacturing material, for example according to the dataset.

For example, in assembly 300, only the first group of mechanical parts is scanned. Mechanical part 309 is not adjacent to any other part in the first group, only to mechanical part 307 which is from a different group. Therefore, mechanical part 309 is not scanned for connections. For example, mechanical connections are identified between mechanical parts 301 and 302, between mechanical parts 302 and 303, and between mechanical parts 301 and 304.

Optionally, the scanning includes identifying associations between mechanical parts which are defined in the file. This may be done by reading metadata in the CAD file. This information is usually accurate and relatively easy to obtain, however it is not always available.

Optionally, the scanning includes identifying connected mechanical parts according to the manufacturing general sizes accuracy tolerances allowed between the mechanical parts.

Optionally, the scanning may be done by using deep learning algorithm which is based on image recognition. The deep learning algorithm classifies features within the mechanical parts (such as screws, screw holes, hinges and the like), to identify the associations between the mechanical parts. The deep learning algorithm may be trained by using existing images which include data of tagged features (for example a few thousand or a few tens of thousands examples of each feature).

For example, the scanning may include identifying bolt connection between mechanical parts. This includes identifying holes defined in mechanical parts, each designated to encompass a bolt, and identifying at least two adjacent holes, having the same axis, defined in at least two adjacent of the mechanical parts.

Identifying the holes may be done by a deep learning algorithm of image recognition, with localization algorithm that is taught using supervised learning. The algorithm may start out with a general dataset used for image recognition. On top of this dataset, a dataset of tagged bolt holes in CAD files may be used.

When all of the bolt holes in all mechanical parts are identified, pairs of holes are searched, that a screw or bolt passes through both in order to connect the two parts. This may be done by finding two holes that are adjacent to each other and which their holes have the same axis vectors have the same direction.

Optionally, references to mechanical parts of the assembly, which are connected to other mechanical parts by identified connections, are stored in a connections dataset. Optionally, each entry in the dataset represents one mechanical part and includes references to all mechanical parts connected to the one mechanical part. Optionally, each entry in the dataset represents an identified connection between two mechanical parts.

Then, as shown at 104, a full cluster of connected mechanical parts is identified based on the scanning. This may be done by a clustering module 204.

The full cluster includes all mechanical parts which are connected to each of the mechanical parts which are included in the full cluster. For example, in assembly 300, mechanical parts 301, 302, 303 and 304 are included in the full cluster. Mechanical part 311 is not connected to any of the other parts, so it is not included in the full cluster.

The connected mechanical parts in the full cluster are designed to be manufactured from similar materials, for example, the connected mechanical parts are included in one mechanical parts group in the dataset.

Then, as shown at 105, a usable cluster of connected mechanical parts to be combined into one mechanical part is identified. The usable cluster is a sub-cluster of the full cluster.

This may be done by an iteration module 205, which iteratively estimates eligibility for additive manufacturing and removes one or more mechanical parts. For each current cluster, which is a sub-cluster of the full cluster, the following is performed:

First, as shown at 106, eligibility is estimated of the mechanical parts in a current cluster to be manufactured as one mechanical part by additive manufacturing. This may be done as described above for single mechanical parts. When the current cluster is eligible for additive manufacturing, it is identified as a usable cluster.

Otherwise, as shown at 107, one or more mechanical parts from the current cluster is removed, so the current cluster is smaller. This is done in a way which is not splitting the cluster, in the sense that each mechanical part in the cluster is connected to at least one other mechanical part in the cluster. The eligibility of the (smaller) current cluster for additive manufacturing is then estimated again, as shown at 106. When only one mechanical part is left in the cluster, it is considered that no usable cluster is identified.

For example, in assembly 300, eligibility is estimated for the full cluster including mechanical parts 301, 302, 303 and 304. When it is concluded that the full cluster is not eligible for additive manufacturing, mechanical part 303 is removed. Parts 301 and 302 are not removed, as this splits the current cluster. Then, eligibility is estimated for a current cluster including mechanical parts 301, 302 and 304. When it is concluded that the current cluster is eligible for additive manufacturing, it is identified as a usable cluster.

Optionally, as shown at 108, the iteration module 205 is repeating the iteration again, by removing different one or more mechanical parts from the current cluster. This way, another different usable cluster may be identified. By repeating the iteration multiple times, and removing different mechanical parts, plurality of alternative usable clusters may be identified.

For example, in assembly 300, mechanical part 304 is now removed instead of mechanical part 303. Then, eligibility is estimated for a current cluster including mechanical parts 301, 302 and 303. When it is concluded that the current cluster is eligible for additive manufacturing, it is identified as another usable cluster.

Optionally, as shown at 109, one or more preferred usable cluster(s) is selected from the alternative usable clusters. This may be done, for example, based on cost estimation of manufacturing each of the alternative usable clusters, and selecting the usable cluster which has the lowest manufacturing cost.

For example, in assembly 300, the first usable cluster including mechanical parts 301, 302 and 304, and the second usable cluster including mechanical parts 301, 302 and 303 are compared, and it is determined that the second usable cluster is more cost-effective to manufacture by additive manufacturing.

Optionally, as shown at 110, a suggestion is presented to the user, to combine all connected mechanical parts in the (preferred) usable cluster into one combined mechanical part and to manufacture the combined mechanical part by additive manufacturing. The suggestion may be presented, for example, as a drawing on a screen 210.

Optionally, an updated digital file, such as an STL file, is created, which includes a description of the one combined mechanical part. Optionally, the updated digital file is transferred to a 3D printer for manufacturing.

Figure 4A:
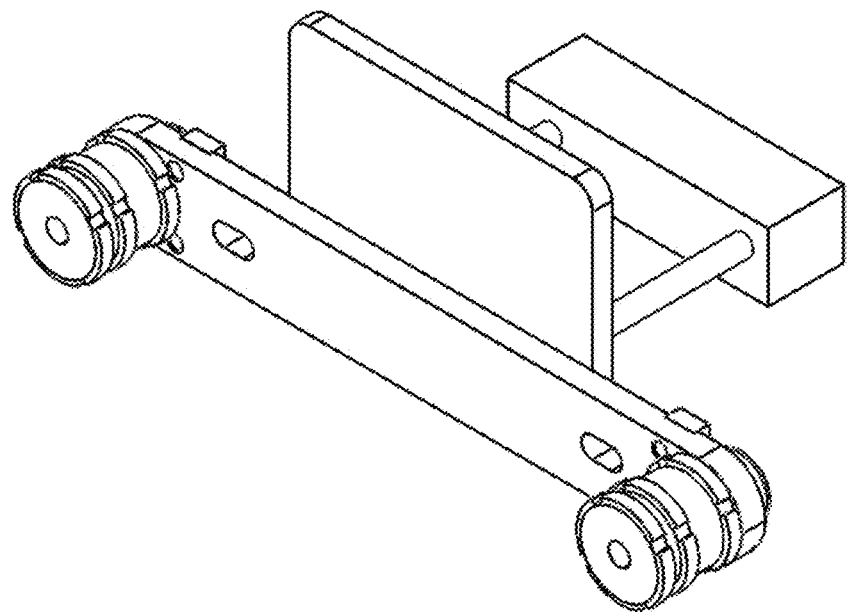
FIG. 4A is a schematic illustration of a full assembly having multiple mechanical parts, according to some embodiments of the present invention.
Figure 4B:
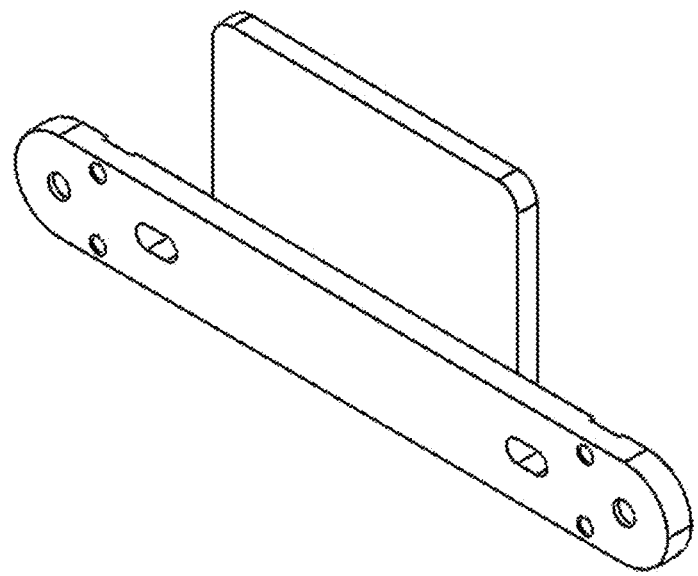
FIG. 4B is a schematic illustration of exemplary mechanical parts of the assembly of FIG. 4A that are included in a usable cluster, according to some embodiments of the present invention.

Reference is now made to FIG. 4A, which is a schematic illustration of a full assembly having multiple mechanical parts, and to FIG. 4B, which is a schematic illustration of exemplary mechanical parts of the assembly of FIG. 4A that are included in a usable cluster, according to some embodiments of the present invention. Manufacturing the mechanical parts of the usable cluster as one mechanical part in this example may save time of assembly, and cost of some connecting elements needed for the assembly.

Optionally, as shown at 111, identification of a full cluster is repeated for mechanical parts designed to be manufactured from each material group of similar materials. For each of these full clusters, a (preferred) usable cluster is identified, selected and optionally presented.

For example, in assembly 300, a second full cluster including mechanical parts 305, 307 and 308 is also identified, and a usable cluster is searched by the iteration module.

Optionally, as shown at 112, a cost estimation of manufacturing the mechanical assembly including the combined mechanical part is presented to the user. This may be based on cost estimations performed during eligibility estimation for single mechanical parts and/or usable clusters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant additive manufacturing technologies will be developed and the scope of the term additive manufacturing is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of optimizing mechanical design for additive manufacturing, comprising:
    acquiring a digital file containing a description of a mechanical assembly, the assembly includes a plurality of mechanical parts;
    scanning the digital file to identify mechanical connections between adjacent of the plurality of mechanical parts;
    identifying a full cluster of connected mechanical parts based on the scanning, the connected mechanical parts are designed to be manufactured from similar materials; and
    identifying a usable cluster of connected mechanical parts to be combined into one mechanical part, the usable cluster is a sub-cluster of the full cluster, by iteratively:
        estimating eligibility of the mechanical parts in a current cluster to be manufactured as one mechanical part by additive manufacturing, the current cluster is a sub-cluster of the full cluster; and
        removing at least one mechanical part from the current cluster.

2. The method of claim 1, wherein the full cluster includes all mechanical parts which are connected to each of the mechanical parts which are included in the full cluster.

3. The method of claim 1, wherein the scanning is done by using deep learning algorithm which is based on image recognition.

4. The method of claim 1, wherein the scanning includes:
    identifying holes defined in the plurality of mechanical parts, each designated to encompass a bolt;
    identifying at least two adjacent of the holes defined in at least two adjacent of the plurality of mechanical parts, the at least two holes having the same axis.

5. The method of claim 1, wherein the scanning includes identifying associations between mechanical parts which are defined in the digital file.

6. The method of claim 1, further comprising, after the acquiring:
    estimating eligibility of each of the plurality of mechanical parts to be manufactured by additive manufacturing;
    wherein said scanning is performed only for a subset of the plurality of mechanical parts which are eligible to be manufactured by additive manufacturing.

7. The method of claim 1, wherein the scanning is performed separately for each of a plurality of subsets of the plurality of mechanical parts, each of the plurality of subsets includes mechanical parts which are designed to be manufactured from similar materials.

8. The method of claim 1, further comprising:
    repeating the identifying usable cluster by removing different from mechanical parts the current cluster to create a plurality of alternative usable clusters.

9. The method of claim 8, further comprising:
estimating cost of manufacturing each of the alternative usable clusters and selecting at least one preferred usable cluster based on the cost estimation.

10. The method of claim 1, further comprising:
repeating the identifying full cluster and the identifying usable cluster for mechanical parts designed to be manufactured from each of a plurality of groups of similar materials.

11. The method of claim 1, wherein the estimating eligibility includes comparing size of the mechanical parts with a maximal size and a minimal size.

12. The method of claim 1, wherein the estimating eligibility includes identifying thickness of thin areas of the mechanical parts.

13. The method of claim 1, wherein the estimating eligibility includes identifying unclosed contours and self-intersections of polygons in the description of the mechanical parts.

14. The method of claim 1, wherein the estimating eligibility includes estimating cost for printing the mechanical parts.

15. The method of claim 1, further comprising, after the scanning:
storing in a dataset a plurality of references to mechanical parts from the plurality of mechanical parts which are associated with the identified mechanical connections.

16. The method of claim 1, further comprising, after the acquiring:
storing in a dataset a plurality of references to mechanical parts from the plurality of mechanical parts which are adjacent to others of the plurality of mechanical parts.

17. The method of claim 1, further comprising:
presenting to a user a suggestion to combine all connected mechanical parts in the usable cluster into one combined mechanical part and to manufacture the combined mechanical part by additive manufacturing.

18. The method of claim 17, further comprising:
presenting to the user a cost estimation of manufacturing the mechanical assembly including the combined mechanical part.

19. A computer readable medium comprising computer executable instructions adapted to perform the method of claim 1.

20. A software program product for optimizing mechanical design for additive manufacturing, comprising:
a non-transitory computer readable storage medium;
a memory for storing a digital file containing a description of a mechanical assembly, the assembly includes a plurality of mechanical parts;
first program instructions for scanning the digital file to identify mechanical connections between adjacent of the plurality of mechanical parts;
second program instructions for identifying a full cluster of connected mechanical parts based on the scanning, the connected mechanical parts are designed to be manufactured from similar materials; and
third program instructions for identifying a usable cluster of connected mechanical parts to be combined into one mechanical part, the usable cluster is a sub-cluster of the full cluster, by iteratively:
estimating eligibility of the mechanical parts in a current cluster to be manufactured as one mechanical part by additive manufacturing, the current cluster is a sub-cluster of the full cluster; and
removing at least one mechanical part from the current cluster;
wherein the first, second and third program instructions are executed by at least one computerized processor from the non-transitory computer readable storage medium.

21. A system for optimizing mechanical design for additive manufacturing, comprising:
a memory for storing a digital file containing a description of a mechanical assembly, the assembly includes a plurality of mechanical parts;
a scanning module for scanning the digital file to identify mechanical connections between adjacent of the plurality of mechanical parts;
a clustering module for identifying a full cluster of connected mechanical parts based on the scanning, the connected mechanical parts are designed to be manufactured from similar materials; and
an iteration module for identifying a usable cluster of connected mechanical parts to be combined into one mechanical part, the usable cluster is a sub-cluster of the full cluster, by iteratively:
estimating eligibility of the mechanical parts in a current cluster to be manufactured as one mechanical part by additive manufacturing, the current cluster is a sub-cluster of the full cluster; and
removing at least one mechanical part from the current cluster.

* * * * *